(12) United States Patent
Baten

(10) Patent No.: US 7,938,379 B2
(45) Date of Patent: May 10, 2011

(54) THREE AXIS ADJUSTABLE MOUNTING SYSTEM

(75) Inventor: Robert A. Baten, Baytown, TX (US)

(73) Assignee: General Electric Company, Schenectady, NY (US)

( * ) Notice: Subject to any disclaimer, the term of this patent is extended or adjusted under 35 U.S.C. 154(b) by 814 days.

(21) Appl. No.: 11/822,932

(22) Filed: Jul. 11, 2007

(65) Prior Publication Data

US 2009/0014621 A1    Jan. 15, 2009

(51) Int. Cl.
  *F16M 1/00*    (2006.01)
(52) U.S. Cl. ............ 248/679; 52/295; 248/674; 248/680
(58) Field of Classification Search .................. 248/678, 248/679, 680, 646, 660, 661, 673, 671, 677, 248/674, 7; 52/292, 293.2, 294, 295
  See application file for complete search history.

(56) References Cited

U.S. PATENT DOCUMENTS

| | | | |
|---|---|---|---|
| 1,211,352 A * | 1/1917 | Rathburn | 248/657 |
| 2,911,169 A * | 11/1959 | Contreras | 248/649 |
| 3,066,898 A * | 12/1962 | Haynes | 248/656 |
| 4,012,021 A * | 3/1977 | Duceppe | 248/651 |
| 4,046,354 A * | 9/1977 | Stith, Jr. | 254/93 R |
| 4,433,824 A * | 2/1984 | Koosha | 248/662 |
| 5,058,870 A | 10/1991 | Cetnar | |
| 5,110,082 A * | 5/1992 | Rowan, Jr. | 248/678 |
| 5,375,458 A | 12/1994 | Oliver et al. | |
| 5,975,480 A * | 11/1999 | Schaefer et al. | 248/678 |
| 6,450,782 B1 * | 9/2002 | Sakamoto | 248/678 |
| 6,508,613 B2 | 1/2003 | Cline et al. | |
| 6,860,475 B2 | 3/2005 | Wong | |
| 7,114,714 B2 | 10/2006 | Wong | |
| 7,168,694 B2 | 1/2007 | Bui et al. | |
| 7,717,395 B2 * | 5/2010 | Rowan et al. | 248/678 |

* cited by examiner

Primary Examiner — Tan Le
(74) Attorney, Agent, or Firm — Nixon & Vanderhye, P.C.

(57) ABSTRACT

A mount assembly for securing a machine base to a foundation including: a first block secured to the machine base; a second block secured to the foundation wherein the first and second blocks are configured for mating engagement that permits adjustment of the machine base relative to the first block and to the foundation along any of three mutually perpendicular axes.

15 Claims, 2 Drawing Sheets

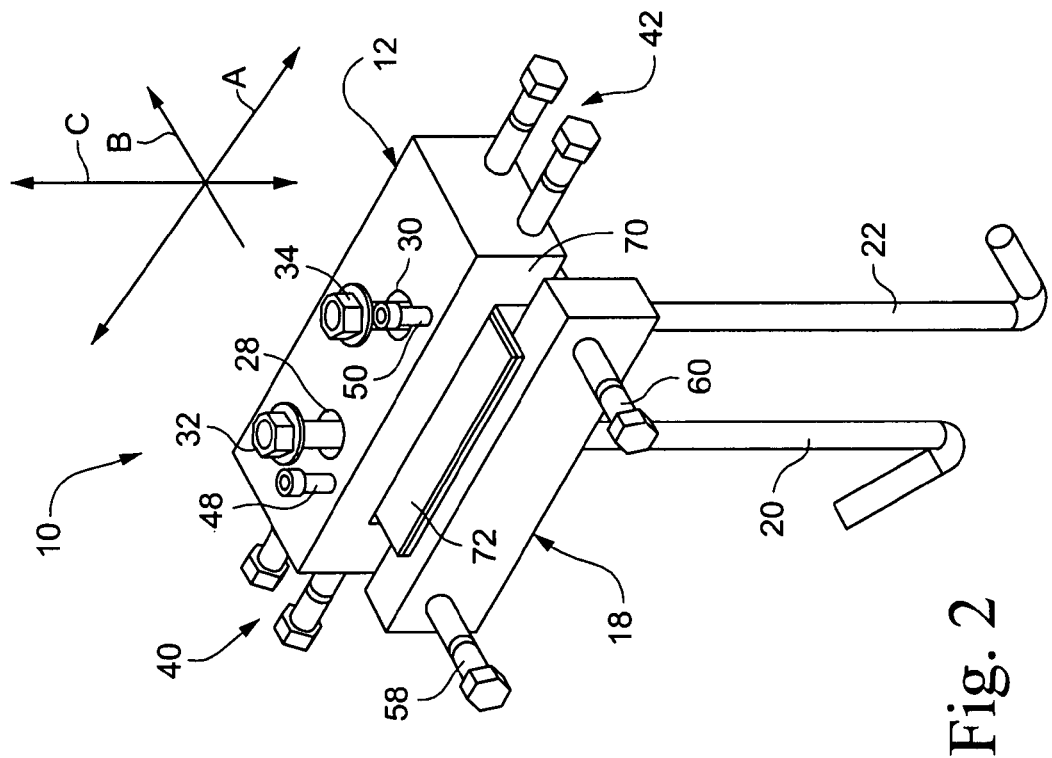
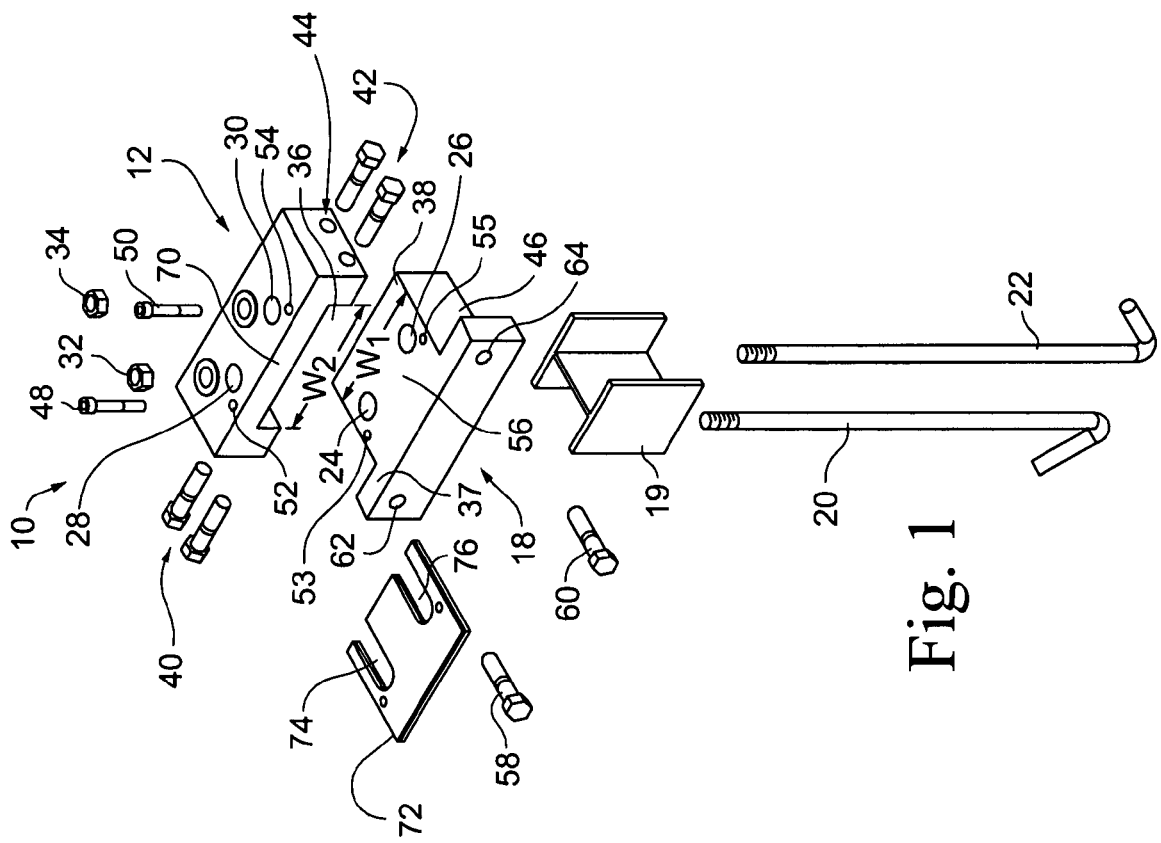

_US 7,938,379 B2_

THREE AXIS ADJUSTABLE MOUNTING SYSTEM

BACKGROUND

This invention relates generally to mounting arrangements for large machines and, more specifically, to an adjustable mounting system for securing turbomachines to a hard foundation.

Oftentimes, large machines such as steam and gas turbines, have skids or frames attached to their undersides, with the skids or frames secured to a foundation by multiple mount assemblies. In prior designs, such mounts allowed for vertical adjustment and some minor horizontal adjustment.

With an increasing demand for smaller machine envelopes, increased portability and commonality of hardware, there is a need for a simple, reliable mounts that afford a greater degree of adjustability in the machine-to-foundation installation process.

BRIEF DESCRIPTION OF THE INVENTION

In accordance with one exemplary, non-limiting embodiment, there is provided a mount assembly for securing a machine base to a foundation comprising: a first block secured to the machine base; a second block secured to the foundation wherein the first and second blocks are configured for mating engagement that permits adjustment of the machine base relative to the first block and to the foundation along any of three mutually perpendicular axes.

In another aspect, there is provided A mount assembly for securing a machine base to a foundation comprising: a first block secured to the machine base; a second block secured to the foundation wherein the first and second blocks are configured for mating engagement that permits adjustment of the machine base relative to the first block and to the foundation along any of three mutually perpendicular axes; wherein the first block is formed with a recessed area, and the second block has a substantially sideways T-shape including a stem portion and a cross portion, the stem portion of the second block adapted to be slidably received in the recessed area; wherein the second block further comprises an anti-shear member extending vertically downwardly from an underside of the second block; and wherein at least one tie-down rod extends through at least one aperture in the second block and through at least one aligned aperture in the first block.

In still another aspect, there is provided a method of securing a machine base to a foundation comprising attaching first and second mount blocks to the machine base; locating the machine base over a foundation in a desired installation position; embedding the second mount block in the foundation; adjusting the machine base and the first mount block to the second mount block along any of three mutually perpendicular axes; and tightening the machine base and the first mount block to the second mount block.

BRIEF DESCRIPTION OF THE DRAWINGS

FIG. 1 is an exploded perspective view of an exemplary, non-limiting implementation of the mount assembly disclosed herein;

FIG. 2 is a perspective view of the mount assembly in FIG. 1, in an assembled state;

DETAILED DESCRIPTION OF THE INVENTION

Figure 3:
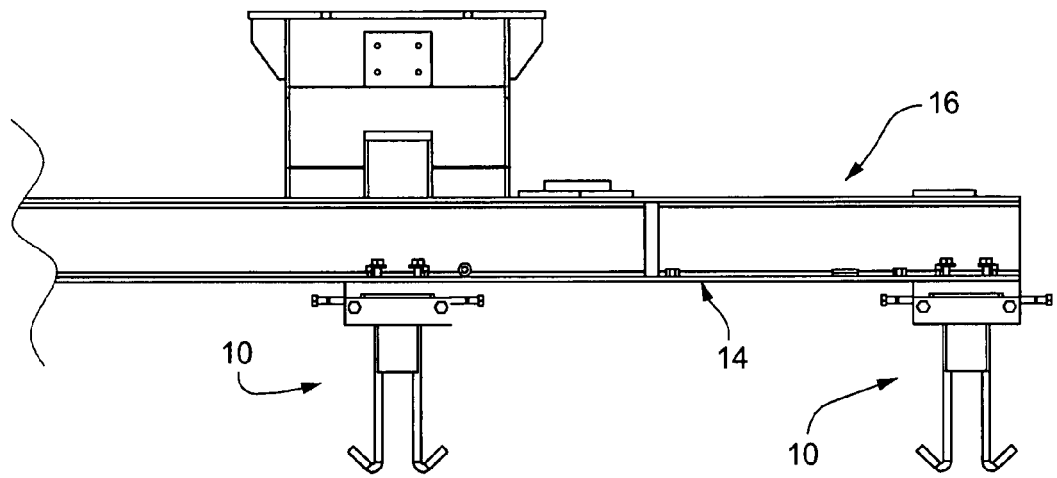
FIG. 3 is a partial side elevation of a machine skid with mount assemblies as shown in FIGS. 1 and 2.

With reference to FIGS. 1 and 2, a mount assembly 10 includes a first mount block (or, simply, "first block") 12 that is welded or otherwise suitably secured to the underside of a beam 14 (FIGS. 3 and 4) of a machine skid or base 16 (FIG. 3), and a second mount block (or, simply, "second block") 18 that is adapted to be embedded within a hard foundation, such as concrete. A shear lug 19, which may have an I-beam shape (or any other suitable shape), is welded or otherwise fixed to the underside of the second block 18. A pair of J-shaped (or other suitable shapes that enhance securement in the foundation) stabilizer or tie-down rods 20, 22 are adapted to pass through respective apertures 24, 26 in the second block 18 and apertures 28, 30 in the first block 12, with threaded ends for receiving complimentary threaded nuts 32, 34, as described further herein.

First block 12 is formed with a generally centered recessed area or slot 36 opening downwardly. The second block 18 is formed with a substantially sideways T-shape, with a cross portion 37 and a stem portion 38 adapted to fit loosely and move within the recessed area or slot 36. Thus, the width $W_1$ of the stem portion 38 is sufficiently smaller than the width $W_2$ of the stem portion 38 to allow sideways adjustment via laterally extending jack screw pairs 40, 42 that are threadably received in respective aperture pairs (one pair shown at 44) in the first block 12, and adapted to contact opposite stem faces (one shown at 46).

A pair of vertically oriented jack screws 48, 50 are adapted to pass through drilled holes 52, 54, respectively, in the block 12 and are threadably received in holes 53, 55 opening on the flat surface 56 of the block 18. The function of screws 48, 50 is described further below.

A second pair of horizontally-oriented jack screws 58, 60 are threadably received in holes 62, 64 in the extended side flanges 66, 68 of the second block, adapted to engage the flat side face 70 of the first block 12, on either side of the recessed area or slot 36.

A flat shim plate 72 is formed with a pair of elongated, parallel slots 74, 76. The plate may be slidably inserted between the first and second blocks, with the slots 74, 76 accommodating the tie-down rods 20, 22, as further described herein.

With reference now to FIG. 3, the mount component assembly 10 may be welded or otherwise secured to the underside of the skid 16 for shipment to the installation site. During shipment and initial placement, the bolts 48, 50 (along with nuts, not shown) are used to clamp the entire assembly together in a neutral position. At the site, the skid 16 is positioned on the foundation and aligned to the generator or other driven equipment while supported on temporary shims along the length of the skid as needed. At this point, the shear lug 19 and J-bolts 20, 22 extend into existing voids in the foundation. Concrete or grout is then poured into the voids up to a level that partially submerges the lower part of the block 18. After the concrete/grout cures, bolts 48 and 50 can be removed and discarded. At this point, the skid 16 should be aligned with all mounting assemblies in a neutral position. Further adjustment in a horizontal position is accomplished with the six horizontal bolts (bolt pairs 40, 42 and bolts 58, 60). More specifically, adjustment in either of two opposite directions along axis A (FIG. 2) is effected with jack screw pairs 40,42. Adjustment in one direction along the axis B is effected with jack screw pair 58, 60. Movement vertically along axis C is accomplished with an external jack and the shim or shims 72 added or removed as required. Tightening nuts 32 and 34 secures the skid to the foundation. Note that apertures 28, 30 are sufficiently oversized relative to the diameter of the rods 20, 22 to permit movement of the first block 12 (with the machine skid) relative to the second block 18 via the jack screw pairs.

Thus, with the above-described mount, adjustments may be made along three mutually perpendicular axes A, B and C.

Figure 4:
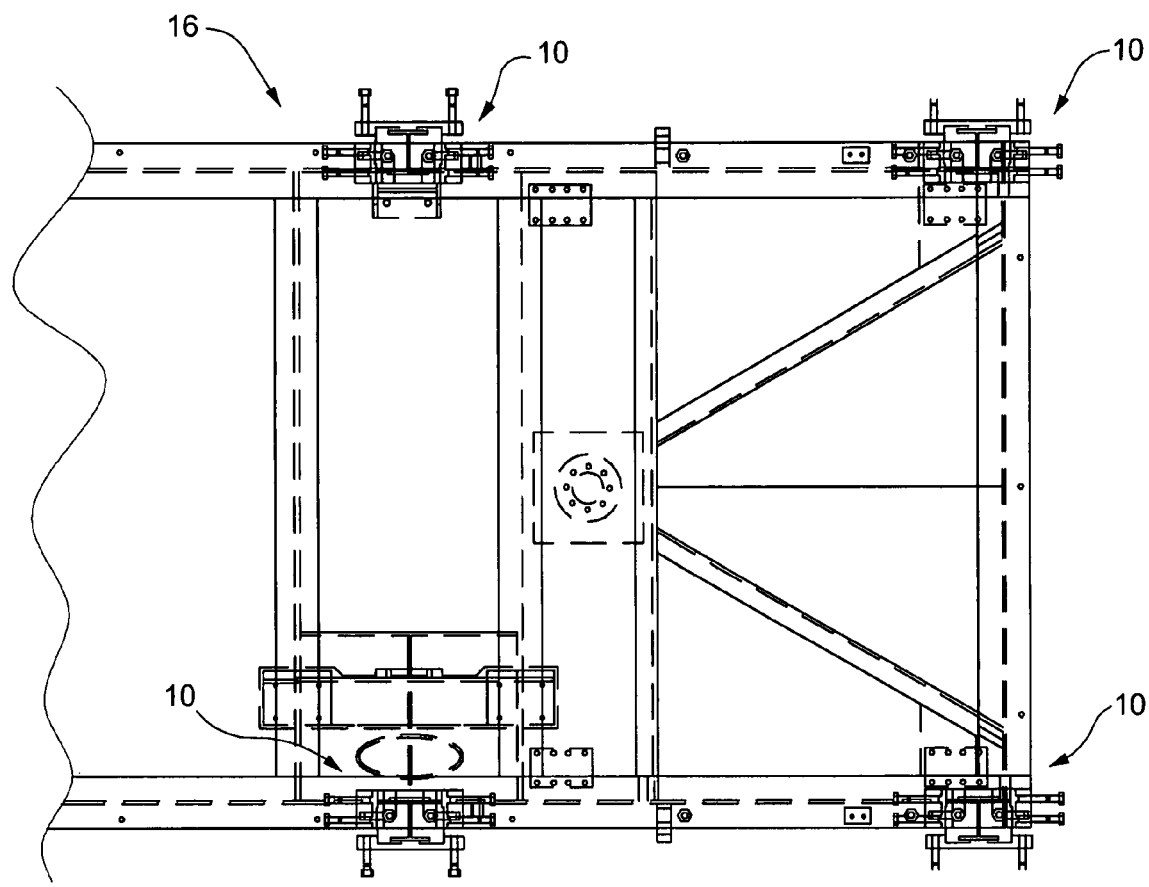
FIG. 4 is a bottom plan view of the skid shown in FIG. 3.

With reference now to FIG. 4, it will be appreciated that multiple mount assemblies may be employed, with two shown on each of two parallel beams 74, 76 of the skid 16. It will further be appreciated that other configurations of the first and second blocks may be suitable, with hydraulically or electrically actuated jacking elements.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mount assembly for securing a machine base to a foundation comprising:
    a first block adapted to be secured to the machine base;
    a second block adapted to be secured to the foundation wherein the first and second blocks are configured for mating engagement that, in use, permits adjustment of the machine base and said first block relative to the second block and the foundation along any of three mutually perpendicular axes; and
    wherein at least one tie-down rod extends through at least one aperture in said second block and through at least one aligned aperture in said first block.

2. The mount assembly of claim 1 wherein said first block is formed with a recessed area that is adapted to slidably receive a portion of said second block.

3. The mount assembly of claim 2 wherein said second block has a substantially sideways T-shape including a stem portion and a cross portion, and wherein the stem portion of said second block is adapted to be slidably received in said recessed area.

4. The mount assembly of claim 3 and further comprising jack screws for moving said first block relative to said secured block.

5. The mount assembly of claim 1 wherein said second block further comprises an anti-shear member extending vertically downwardly from an underside of said second block.

6. The mount assembly of claim 1 wherein said at least one tie-down rod comprises a pair of tie-down rods extending through respective pairs of apertures in said second and first blocks, respectively.

7. The mount assembly of claim 6 wherein lower ends of said tie-down rods are bent and adapted to be embedded in the foundation, and wherein upper ends are threaded and adapted to receive complimentary threaded nuts.

8. The mount assembly of claim 3 wherein said recessed area is moveable relative to said stem portion in directions parallel to said three mutually perpendicular axes.

9. The mount assembly of claim 1 wherein plural jack screws effect movement of said first block relative to said second block.

10. The mount assembly of claim 8 wherein plural jack screws effect movement of said first block relative to said second block.

11. A mount assembly for securing a machine base to a foundation comprising:
    a first block adapted to be secured to the machine base;
    a second block adapted to be secured to the foundation wherein the first and second blocks are configured for mating engagement that, in use, permits adjustment of the machine base and said first block relative to the second block and the foundation along any of three mutually perpendicular axes; wherein said second block further comprises an anti-shear member extending vertically downwardly from an underside of said second block; and further
    wherein said anti-shear member has an I-beam cross-sectional shape and is welded to the underside of the second block.

12. A mount assembly for securing a machine base to a foundation comprising: a first block adapted to be secured to the machine base; a second block adapted to be secured to the foundation wherein the first and second blocks are configured for mating engagement that, in use, permits adjustment of the machine base and the first block relative to the foundation and the second block along any of three mutually perpendicular axes;
    wherein said first block is formed with a recessed area, and said second block has a substantially sideways T-shape including a stem portion and a cross portion, said stem portion of said second block adapted to be slidably received in said recessed area;
    wherein said second block further comprises an anti-shear member extending vertically downwardly from an underside of said second block; and
    wherein at least one tie-down rod extends through at least one aperture in said second block and through at least one aligned aperture in said first block.

13. The mount assembly of claim 12 and further comprising jack screws for moving said first block relative to said secured block.

14. The mount assembly of claim 12 wherein said at least one tie-down rod comprises a pair of tie-down rods extending through respective pairs of apertures in said second and first blocks, respectively, and adapted to extend through additional apertures in said machine base.

15. The mount assembly of claim 14 wherein lower ends of said tie-down rods are bent and adapted to be embedded in the foundation, and wherein upper ends are threaded and adapted to receive complimentary threaded nuts.

\* \* \* \* \*